United States Patent [19]

McCann et al.

[11] Patent Number: 4,643,491
[45] Date of Patent: Feb. 17, 1987

[54] FLUID-PRESSURE OPERATED ANTI-SKID BRAKING SYSTEMS FOR VEHICLES

[75] Inventors: Denis J. McCann, Powys; Edwin R. Carswell, Abergavenny, both of Wales

[73] Assignee: Lucas Industries Public Limited Company, England

[21] Appl. No.: 774,096

[22] Filed: Sep. 9, 1985

[30] Foreign Application Priority Data

Sep. 7, 1984 [GB] United Kingdom ............... 8422711

[51] Int. Cl.$^4$ ................................................ B60T 8/02
[52] U.S. Cl. ........................................ 303/118; 303/7
[58] Field of Search ............... 188/181 A; 303/7, 40, 303/103, 105, 110, 113, 118, 119

[56] References Cited

U.S. PATENT DOCUMENTS

| | | | |
|---|---|---|---|
| 3,907,379 | 9/1975 | Lawson | 303/118 |
| 4,175,795 | 11/1979 | Mortimer et al. | 303/118 |
| 4,210,370 | 7/1980 | Mortimer | 303/118 |

*Primary Examiner*—Duane A. Reger
*Attorney, Agent, or Firm*—Laff, Whitesel, Conte & Saret

[57] ABSTRACT

In a fluid-pressure operated anti-skid braking system operation of a brake-applying relay valve is controlled by control pressure in an application chamber. A memory chamber is charged on initial brake application with pressure from supply passage connected to a brake actuator through one-way valve and an orifice permits pressure in the memory chamber to decay when the pressure in the supply passage reduces. This reduces the effective volume of air required for initial operation of the relay valve thereby increasing its response time. Re-application of the brake following a skid is controlled by closure of a latch valve which permits only a restricted flow of control pressure into the application chamber. This is sufficient to re-apply the brakes rapidly in a first stage until the pressure in the application chamber becomes equal to that of the decayed pressure in the memory chamber, whereafter brake re-application continues at a slower rate since the restricted flow of control pressure has also to increase the pressure in the memory chamber.

10 Claims, 11 Drawing Figures

FLUID-PRESSURE OPERATED ANTI-SKID BRAKING SYSTEMS FOR VEHICLES

This invention relates to improvements in fluid-pressure operated anti-skid braking systems for vehicles of the kind in which fluid from a supply is supplied to a brake actuator through a brake-pressure control assembly, and the assembly incorporates a fluid-flow control relay valve interposed in the line between the supply and the brake, an application chamber subjected to a control pressure to control operation of the relay valve, means responsive to a skid signal for operating the relay valve to relieve the brake pressure of the fluid supplied to the actuator from the supply at a skid point determined by the skid signal, and a memory chamber for storing a memory pressure dependant upon the brake pressure occurring at the skid point to provide a datum or changeover point between first and second successive stages of brake re-application, the first stage comprising the re-application to the brake of the supply fluid from the supply until a pressure less than the pressure at the skid point is attained at the changeover point, and the second stage comprising the continued re-application to the brake of the supply fluid but at a reduced rate of pressure increase.

In some anti-skid systems of the kind set forth, the memory chamber is fed by the control fluid and conveniently, as in the system of GB-A-2002471, from the application chamber itself. As the control fluid has to pressurise both the application chamber and the memory chamber, the response time of the relay valve in actuating the actuator tends to be increased.

In the past in such known anti-skid systems the response times, as governed by EEC/ECE regulations, have been achieved by paying particular attention to the efficiency of the fluid piping layouts.

Recent trends, particularly with regard to fluid-pressure operated anti-skid systems for trailer vehicles, are towards increasing the size of the actuators for the wheel brakes with inherent increase in the volumes of the fluid supply. Additionally, actuators incorporating double-diaphragms are often used and such actuators also require a higher fluid pressure volume than equivalent actuators of the single diaphragm type.

It is therefore becoming increasingly difficult for such known anti-skid systems to meet the response times laid down by legislation.

According to our invention in a fluid-pressure operated anti-skid braking system of the kind set forth the control assembly is so adapted that upon initial brake application in a common braking cycle the memory chamber is fed with fluid from the supply.

This reduces the response time of the relay valve since it is only necessary for the control fluid to provide a volume sufficient to pressurise the application chamber.

The fluid for pressurising the memory chamber is therefore taken from the supply side of the relay valve in which the volume of the memory chamber is small in comparison with the volume of supply fluid required to operate the actuator, rather than from the control side, as in known systems, in which the volume of the memory chamber is large in comparison with that of the application chamber.

During the said initial brake application the supply pressure is fed to the memory chamber through a memory valve, and the memory chamber is isolated from the application chamber by a pressure-responsive valve which is normally closed.

During brake re-application following correction of the skid the one-way valve remains closed, and the pressure-responsive valve opens in response to a predetermined differential between the pressures in memory chamber and the application chamber, whereafter the pressures in two chambers equalise at the changeover point.

Some embodiments of our invention are illustrated in the accompanying drawings in which.

In the anti-skid braking system illustrated in FIGS. 1 to 5 of the drawings, and particularly suitable for use with a trailer vehicle, a skid control unit 1 is adapted to regulate the supply of pneumatic fluid from a source 2, suitably a reservoir, to an actuator 3 of a brake 4 in accordance with the deceleration of the wheel braked by the brake 4.

Figure 1:
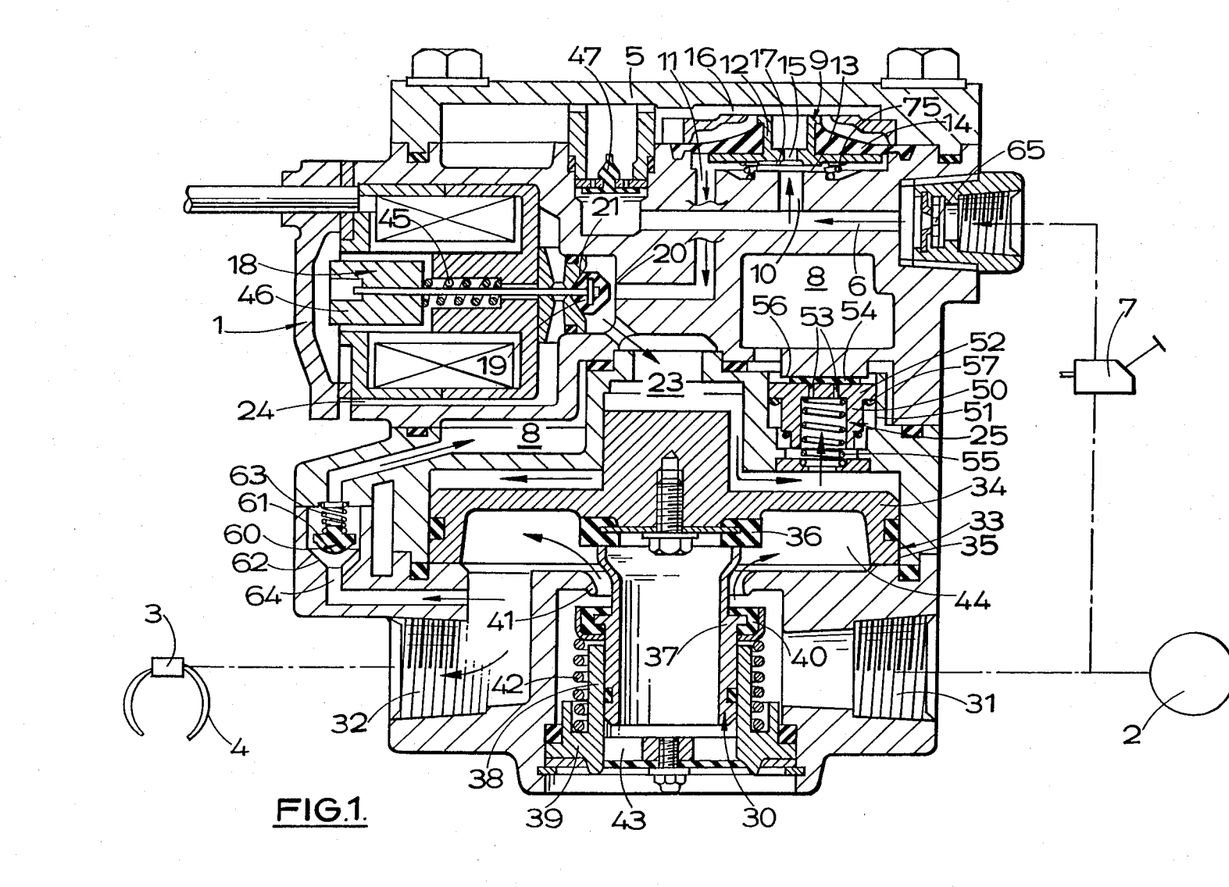
FIG. 1 is a transverse section through a skid control unit in a pneumatically-operable braking system showing the unit in a normal brake-applying mode.

As illustrated the unit 1 comprises a housing 5 having a first inlet supply passage 6 connected to a pedal-operated treadle air valve 7 for controlling a branch supply from the source 2, a memory chamber 8, illustrated in this section on opposite sides of the axis of the housing 5, and a latch valve 9 which controls communication between spaced ports 10 and 11 in the passage 6. The latch valve 9 comprises a valve member 12 for engagement with a seating 13 surrounding the port 10, and carried by a flexible diaphragm 14. The valve member 12 is provided with a bleed orifice 15 providing a restricted flow into a chamber 16 above the diaphragm 14 and extending transversely, even when the latch valve 9 is shut, to cut-of flow through the supply passage 6 except through a restricted passage defined by a gap 17 in the valve member 12. The chamber 16 also communicates with the supply passage at a position downstream of the port 10, through a one-way valve 47.

A solenoid-operated valve 18 responsive to an electrical signal from means responsive to deceleration of a braked wheel and including a control module incorporates a valve member 19 engageable alternatively with first and second spaced seatings 20 and 21. The first seating 20 is disposed between the supply passage 6 and an application chamber 23, and the second is disposed between the application chamber 23 and an exhaust passage 24. The volume of the application chamber 23 is small in comparison with that of the memory chamber 8.

When the solenoid is de-energized, during normal braking the valve member 19 is engaged with the seating 21. The supply passage 6 is in communication with the application chamber 23 through the open latch valve 9, and light spring 75 acts on the valve member 12 to hold the latch valve 9 open. Thus operator-controlled control pressure will be supplied to the application chamber 23 through the latch valve 9 and the supply passage 6, and the latch valve 9 will remain open since equal pressures are applied to opposite sides of the diaphragm 14.

A pressure-responsive valve 25 controls communication between the application chamber 23 and the memory chamber 8. The valve 25 comprises a hollow piston 50 of stepped outline housed in a bore 51. The crown 52 of the piston 50 which is of greater diameter works in the bore 51 and is provided with two axially extending passages 53 which are normally closed by a flap valve member 54 carried by the outer face of the crown 52. A spring 55 urges the piston 50 inwardly so that the flap member 54 is clamped against a face 56 at the inner end of the bore 51 and seals the passages 53 to isolate the memory chamber 8 from the application chamber 23. An annular seal 57 of elastomeric material provides a seal between the wall of the bore 51 and the portion of the piston 50 which is of smaller diameter.

The housing 1 also accommodates fluid-flow control means comprising a relay valve 30 for controlling communication between an inlet supply passage 31, which is connected to the source 2, and an outlet supply passage 32 which is connected to the actuator 3 of the brake 4.

The relay valve 30 comprises a bore 33 of stepped outline and a piston 34 defining the lower end of the application chamber 23 works in the inner portion 35 of the bore 33 which is of greater diameter. A valve head 36 on the face of the piston 34 which is opposite the chamber 23 is engageable with the inner end of a sleeve 37, and the sleeve 37 is guided in an inwardly projecting axial skirt 38 of a closure member 39 for the outer end of the bore 33 which is of smaller diameter. The sleeve 37 has a radial flange 40 comprising a valve head which is urged inwardly towards a shoulder 41 at the step at the change in diameter by means of a compression spring 42, and the closure member 39 is provided with at least one exhaust port 43 communicating with the interior of the sleeve. The inlet passage 31 is located on the same side of the seating 41 as the valve head 40 and the outlet passage 32 is located on the opposite side thereof. Thus, in the inoperative position shown in FIG. 1 of the drawing, communication between the inlet passage 31 and a chamber 44 in the bore 33 to which the side of the piston 34 carrying the valve head 36 is exposed is cut-off by the engagement of the head 40 with the seating 41, and that chamber 44 is exhausted to atmosphere through the port 43 since the head 36 is spaced from the sleeve 37.

The chamber 44 is connected to the memory chamber 8 through a one-way memory valve 60 comprising a valve member 61 which is biassed towards a seating 62 in the housing 5 by means of a spring 63.

A notch 64 is provided in the seating 62 to define a metered orifice which determines the rate at which pressure in the memory chamber 8 can decay when the one-way valve 60 is closed with the valve member 61 in engagement with the seating 62.

In an inoperative position, and when the brakes are to be applied, the valve member 19 is held in engagement with the seating 21 by means of a spring 45 which acts on an armature 46 carrying the valve member 19. This isolates the application chamber 23 from atmosphere. Also the latch valve 9 is held in the open position by the spring 75. Control pressure from the treadle valve 7 is supplied from the inlet supply passage 6 to the application chamber 23 of the relay valve 30 through the latch valve 9, which remains in the open position since equal pressures are applied to opposite sides of the diaphragm 14. The pressure in the application chamber 23 also acts on the piston 50 to urge it towards the surface 56 and enhance the force in the spring 55. This ensures that the flap valve member 54 makes good contact with the surface 56. The pressure in the application chamber 23 acts on the piston 34 to urge it downwardly with the result that the valve head 36 engages with the upper end of the sleeve 37 to isolate the chamber 44 from atmosphere. Thereafter further movement of the piston 34 in the same direction moves the flange 40 away from the seating 41 so that the brakes are operated by pressure from the inlet passage 31 which passes to the outlet passage 32 through the chamber 44, and to the memory chamber 8 through the one-way valve 60. The memory chamber 8 is therefore charged up by the brake supply pressure.

Figure 2:
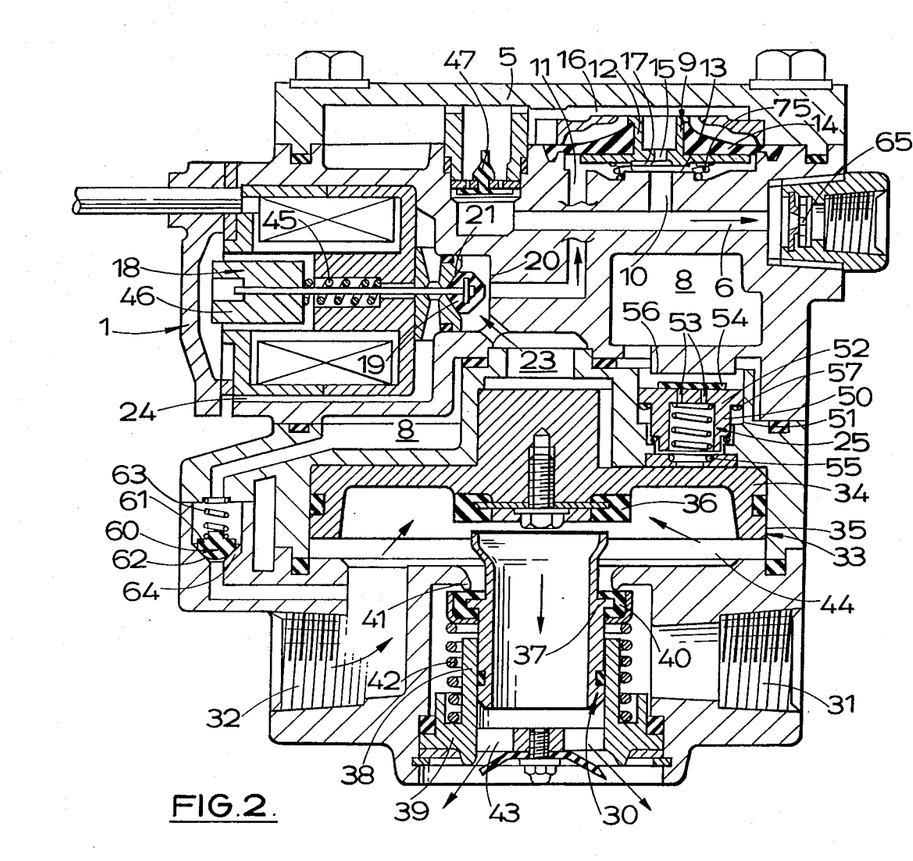
FIG. 2 is a view similar to the unit of FIG. 1 but with the unit in a brake release mode.

As shown in FIG. 2, when the control pressure in the application chamber 23 is released by the treadle valve 7 it exhausts through the passage 6 and a control orifice 65.

The relay valve 30 responds to this reduction in control pressure and air exhausts from the brake actuator 3 through the chamber 44 and the exhaust ports 43.

The piston 50 moves away from the surface 56 against the loading in the spring 55 since the pressure trapped in the memory chamber 8 is substantially higher than that in the chamber 23, and the pressure in the memory chamber 8 holds the flap valve member 54 against the crown of the piston 50 to prevent flow through the passages 53. The pressure in the memory chamber 8 also causes the one-way valve 60 to close due to the reduction in the supply pressure. The pressure in the memory chamber is then slowly lost through the metered orifice 64.

Figure 3:
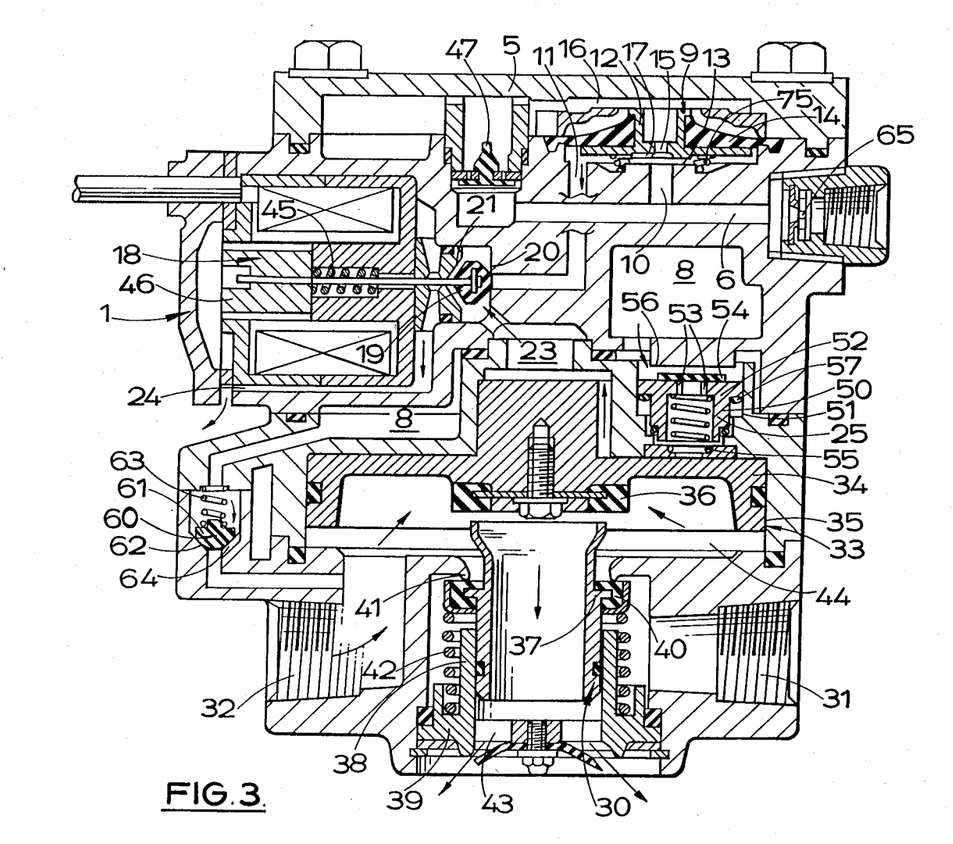
FIG. 3 is a view similar to the unit of FIG. 1 but with the unit in an anti-lock brake release mode.

As shown in FIG. 3, when the deceleration of the wheel braked by the brake 4 exceeds a predetermined value the solenoid-operated valve 18 is energised by a skid signal and the armature 46 is urged inwardly against the loading in the spring 45 to cause the valve member to engage with the seating 20. This cuts off communication between the supply passage 6 and the application chamber 23. The application chamber 23 is, in addition, exhausted to atmosphere through the exhaust passage 24 although the latch valve 9 remains in the open position.

The reduction in pressure in the application chamber 23 permits the piston 34 to move relatively away from the closure member 39 with the sleeve 37 also moving away from the closure member 39 under the influence of the spring 42 until the flange 40 engages with the seating 41 to isolate the inlet passage 31 from the outlet passage 32. Further movement of the piston 34 in the same direction moves the head 36 away from the sleeve 37 so that air under pressure in the chamber 44 is exhausted to atmosphere through the port 43.

The piston 50 moves down with the ports 53 closed by the flap valve member 54, and the one-way valve 60 closes, as described above.

The pressure in the memory chamber 8 also reduces through the metered orifice 64 and the exhaust port 43 but at a rate of decay controlled by the metered orifice 64.

Figure 4:
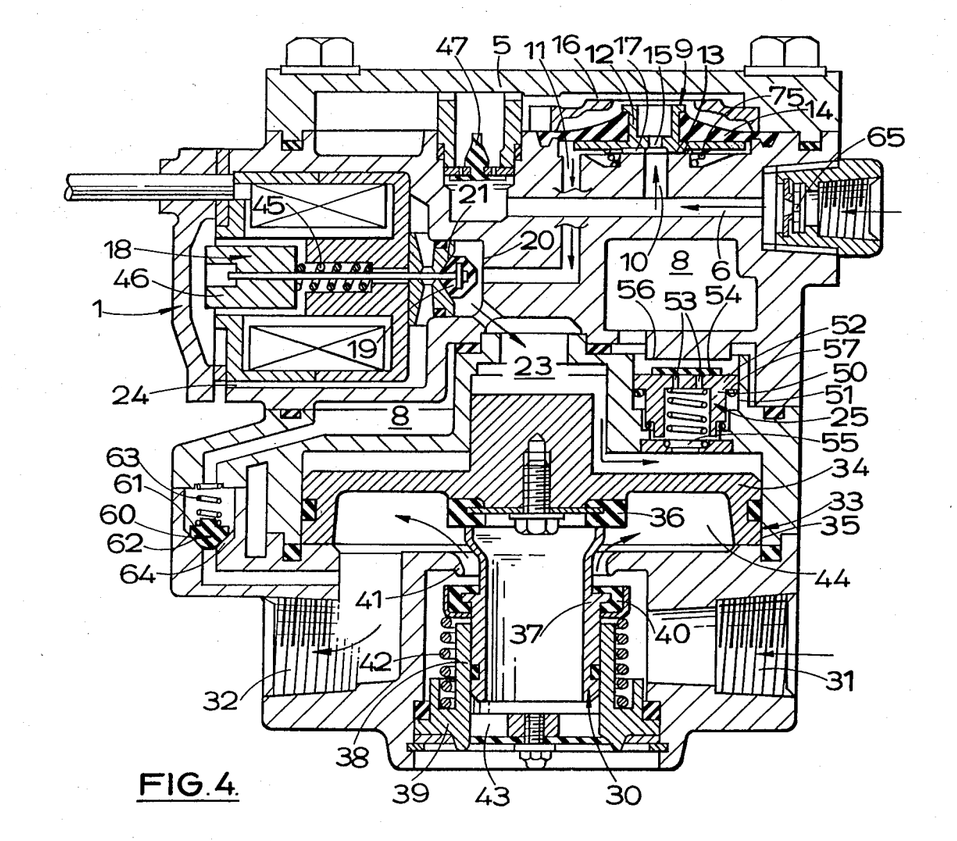
FIG. 4 is a view similar to the unit of FIG. 1 but with the unit in the first stage brake re-apply mode following correction of a skid.

When the control module detects that wheel lock has been overcome, as shown in FIG. 4 the solenoid is de-energised so that the valve member 19 re-engages the seating 21 to isolate the application chamber 23 from atmosphere and to open the supply passage 6 to the application chamber 23. This reduces the pressure acting on the underside of the diaphragm 14 so that the latch valve 9 closes against the force in the spring 75 and the latch valve 9 remains shut during the remainder of that brake applying sequence.

Pressure in the application chamber 23 is rapidly increased by the flow through the restricted passage defined by the gap 17 to provide a restricted flow with the latch valve 9 shut. The relay valve 30 is operated as described above in response to pressure in the application chamber 23 to re-apply the brakes.

Since the volume of the application chamber 23 is relatively small the pressure in the application chamber 23 rises rapidly during the first stage of brake re-application.

Initially the pressure in the memory chamber 8 is greater than the control pressure in the application chamber 23 and therefore holds the piston 50 in its downward position with the crown spaced from the surface 56. The area of the piston 50 which is reacted upon by the pressure in the memory chamber 8 is greater than the area reacted on by the control pressure in the chamber 23. The memory pressure therefore continues to hold the flap 54 against the crown of the piston 50.

The memory pressure is also greater than the supply pressure and therefore holds the one-way valve 60 closed, but the memory pressure decays by bleed through the metered orifice 64 at a reducing rate, as the supply pressure applied to the actuator 3 rises.

During the anti-lock pressure release cycle described above with reference to FIG. 5, the pressure in the memory chamber 8 has been decaying through the orifice 64. The pressure thus provides a reference pressure which is dependent upon both the energisation of the solenoid 18 and the supply pressure causing wheel lock, and hence is indicative of road adhesion conditions.

Figure 5:
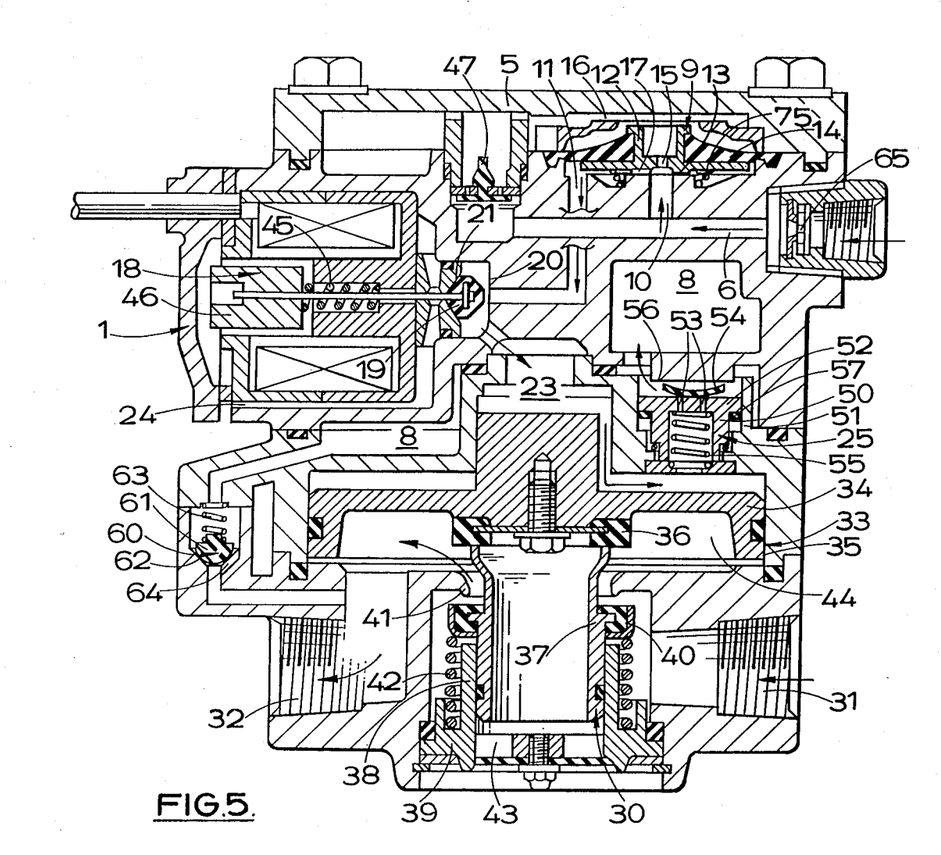
FIG. 5 is a view similar to FIG. 4 but showing the second stage re-apply mode.

When the control pressure in the application chamber 23 rises to equal the decayed memory pressure, the piston 50 remains in its downward position due to the different areas reacted on by the pressures in the chambers 8 and 23 as described above.

As the pressure in the chamber 23 continues to rise and equals the pressure in the chamber 8, at the change-over point the flap valve 54 opens and the memory chamber 8 is then charged from the application chamber 23 as shown in FIG. 5.

Since the volume of the memory chamber 8 is large in comparison with the volume of the application chamber 23, the subsequent rate of pressure increase in the application chamber 23 takes place at a slower rate which, in turn, provides a reduced rate of pressure increase for the supply pressure applied to the actuator 3. Thus the brakes are re-applied in a second stage but at a reduced rate of pressure increase. This continues through the remainder of the brake re-application in a common cycle following a skid condition, until the end of that brake applying sequence, or until a further skid condition is reached, whereupon the sequence of brake release and re-application described above is repeated.

The load in the spring 64 applied to the valve member 61 is chosen such that, together with the increased pressure in the memory chamber 8, it ensures that the one-way valve remains closed and thus all charging of the memory chamber 8 takes place from the application chamber 23.

Figure 6:
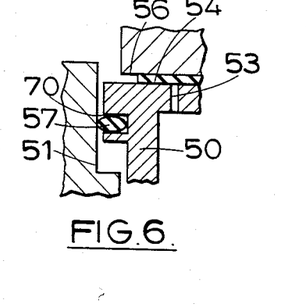
FIG. 6 shows a modification to the pressure-responsive valve.

In the modification shown in FIG. 6 the seal 57 is trapped in a radial groove 70 in the piston 50. This increases the relative difference between the two areas of the piston 50 over which the pressure in the chambers 8 and 23 act by ensuring that the seal 57 cannot contact, and therefore seal against, a shoulder at the end of the bore 51 which is remote from the surface 56.

Figure 7:
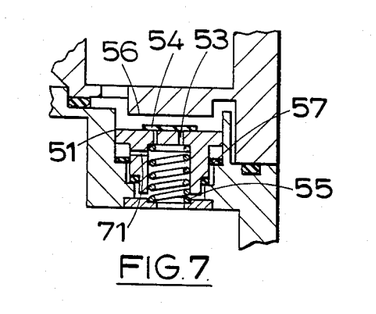
FIG. 7 shows another construction of pressure-responsive valve with the valve in an open position.
Figure 8:
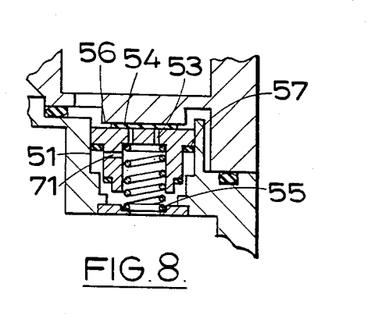
FIG. 8 is similar to FIG. 7 but shows the valve in a closed position.

In the modified construction shown in FIGS. 7 and 8 the notch 64 is omitted and a metered orifice 71 is incorporated in the piston 50.

The construction and operation of the pressure-responsive valve 25 is otherwise the same as that described above except that the pressure in the memory chamber 8 is now allowed to bleed into the application chamber 23 through the orifice 71.

Depending upon the relative position of the piston 50 in the bore 51, the seal 57 moves to the corresponding side of the orifice 71 when acted upon by the appropriate differing pressures in the application chamber 23 and the memory chamber 8.

The flap valve 54 is still operative to prevent the memory chamber 8 from being charged from the application chamber 23 on the initial brake application in a common anti-lock cycle.

Figure 9:
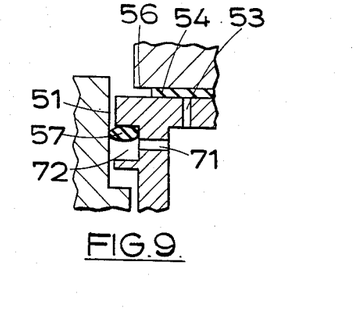
FIG. 9 is a view similar to FIG. 7 but showing a modification.
Figure 10:
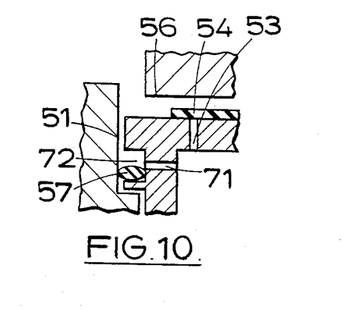
FIG. 10 is similar to FIG. 9 but shows the valve in a closed position.

In the modification of FIGS. 7 and 8 shown in FIGS. 9 and 10, the seal 57 is retained in a radial groove 72 of sufficient axial length as to permit movement of the seal between opposite sides of the orifice 71 in accordance with movement of the piston between its two extreme positions, but insufficient to permit the seal 57 to engage with a shoulder in the bore 51 at the end remote from the surface 56. As in the modification of FIG. 6 this ensures that that relative difference between the two effective areas of the piston 50 is conserved.

Upon release of the treadle valve 7 the components are restored to the position shown in FIG. 2 of the drawings with all chambers exhausted to atmosphere. The one-way valve 47 opens to exhaust pressure from the chamber 16 to ensure that the latch valve 9 opens rapidly.

Figure 11:
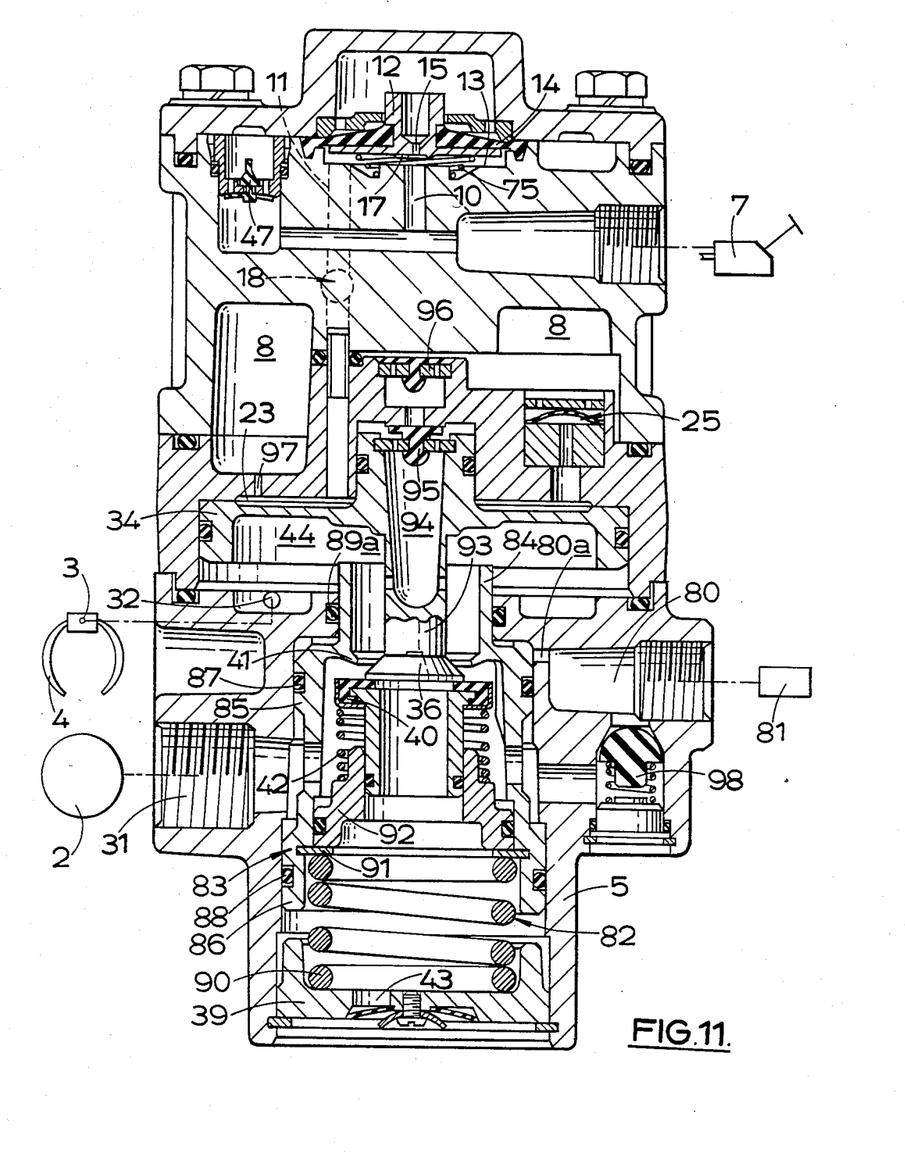
FIG. 11 is a transverse section through another skid control unit in a pneumatically-operable braking system for a trailer vehicle.

The anti-ski braking system illustrated in FIG. 11 of the drawings is designed for use with a trailer vehicle towed by a tractor. As illustrated the skid control unit 1 is modified to include a connection 80 to an emergency trailer supply 81, from the tractor, and a safety spring assembly 82 is incorporated in the relay valve 30. The spring assembly 82 is arranged automatically to urge the relay valve 30 into a position to isolate the brake 4 from the exhaust port 43 and to place the reservoir 2 in direct communication with the brake 3 in the event of failure of the emergency supply 81.

The safety spring assembly 82 comprises a stepped piston 83 having three portions 84, 85, and 86 of smaller, intermediate, and greater diameters in a direction towards the exhaust port 43. The three portions work in complementary portions of corresponding diameters in the housing 5, and seals 89, 87 and 88 are provided between the surfaces of each complementary pair of portions. The seals 89a and 87 are positioned on opposite sides of a passage 80a leading from the connection 80, and the seals 87 and 88 are located on opposite sides of the connection 31 to the source 2. A safety compression spring 90 acts between an abutment defined by the closure member 39 and an abutment 91 comprising a ring coupled to the piston 83 to bias the piston 83 in an inwards direction.

The sleeve 37 of the relay valve 30 is guided in a sleeve 92 in abutment with the ring 91, and the spring 42 acts in a direction to urge the valve head 40 towards the seating 41 which is defined by an inwardly directed radial flange on the piston 83. The valve head 36 is of frusto-conical outline and is carried by the lower end of a stem 93 depending from the piston 34 for engagement with the valve head 40 in order to isolate the chamber 44 from the exhaust port 43.

The two portions of the piston 34 are sealing guided in respective portions of the bore 33. The stem 93 is hollow for a portion 94 terminating at the upper end of the piston 34 to provide communication between the chamber 44 and the memory chamber 8 through a memory valve comprising a cut-off valve 95 at the upper end of the piston 34 and a one-way valve 96 in the housing 5. A metered orifice 97 is located between the memory chamber 8 and the application chamber 23.

A further one-way valve 98 permits communication in one direction from the connection 80 from the emergency trailer supply 81, to the connection 31 to the reservoir 2.

When the trailer is correctly coupled to the tractor, pressure from the emergency trailer supply 81 from the tractor is supplied to the connection 80. This pressure acts on the shoulder on the piston 83 at the step at the change in diameters between the portions 84 and 85 to urge the piston 83 into a retracted position against the force in the safety spring 90 and with the piston 83 in abutment with the closure 39. In this position the seating 41 is in engagement with the head 40 to isolate the connection 31 from the chamber 44, and the head 40 is spaced from the head 36 to place the chamber 44 in communication with the exhaust port 43. In addition fluid from the supply 81 is supplied to the reservoir 2, through the one-way valve 98, in order to pressurise it.

When the brake 4 is to be applied by the application of control pressure to the piston 34, the head 36 engages with the head 40 to isolate the chamber 44 from the exhaust port 43. Further movement of the piston 34 in the same direction then urges the head 40 away from the seating 41 and against the force in the spring 42 so that fluid under pressure from the reservoir 2 and from the supply 82 is supplied to the brake 3. During this operation fluid from the chamber 44 also passes to the memory chamber 8 through the valves 95 and 96 so that the memory chamber 8 is charged up by the brake supply pressure.

In the event of the trailer becoming accidentally detached from the tractor and at least the line from the emergency trailer supply 81 being severed, the pressure acting to hold the piston 83 in the retracted position is relieved through the passage 89 and the connection 80. The spring 90 urges the piston 83 inwardly into the advanced position shown in the drawing. During this movement the piston 83 carries the head 40 with it, causing it to engage with the head 36 and isolate the chamber 44 from the exhaust port 43. Further movement of the piston 83 in the same direction separates the seating 41 from the head 36 and the reservoir 2 is placed in direct communication with the chamber 44 to apply the brake automatically.

The construction and operation of the system illustrated in FIG. 11 is otherwise the same as that of FIGS. 1 to 5 and corresponding reference numbers have been applied to corresponding parts.

We claim:

1. A fluid-pressure operated anti-skid braking system including a wheel brake, an actuator for said wheel brake, a supply of brake-applying fluid, a brake-pressure control valve assembly through which fluid from said supply is supplied to said actuator, and control pressure means for operating said control valve assembly, wherein said control valve assembly incorporates a brake-applying chamber connected to said actuator, a fluid-flow control relay valve interposed between said supply and said brake for controlling pressurization of said brake-applying chamber by fluid from said supply, an application chamber subjected to said control pressure means to control operation of said relay valve, means responsive to a skid signal for operating said relay valve at a skid point determined by said skid signal to relieve the pressure of the fluid supplied to said actuator from said brake-applying chamber, a memory chamber for storing a memory pressure dependant upon the brake pressure occurring at said skid point to provide a datum or changeover point between first and second successive stages of brake re-application, said first stage comprising the re-application to said brake of the supply fluid from said supply until a pressure less than the pressure at said skid point is attained at said changeover point, and said second stage comprising the continued re-application to said brake of said supply fluid but at a reduced rate of pressure increase, and means connecting said memory chamber to said brake-applying chamber for feeding said memory chamber with fluid from said supply upon initial brake application in a common braking cycle.

2. A braking system as claimed in claim 1, wherein said control valve assembly includes a memory valve located in said connecting means, and a pressure-responsive valve, and said supply pressure is fed to said memory chamber through said memory valve during the said initial brake application, and said memory chamber is isolated from said application chamber by said pressure-responsive valve which is normally closed but which opens substantially at said changeover point, whereafter said memory chamber is charged from said application chamber by said control pressure means.

3. A braking system as claimed in claim 2, wherein said memory valve comprises at least one one-way valve disposed in said connection between said brake-applying chamber and said memory chamber.

4. A braking system as claimed in claim 2, wherein said memory valve incorporates a metered orifice which determines the rate at which pressure in said memory chamber can decay.

5. A braking system as claimed in claim 2, wherein said pressure-responsive valve comprises a piston working in a bore and having at least one port, in combination with a valve member for controlling flow through said port in said piston, said control valve assembly having a face adjacent to said piston, and said valve member normally being clamped between said piston and said face on said control valve assembly to prevent flow through said port, but movable away from said piston and said face in response to a pressure differential, after said piston has moved relatively away from said face.

6. A braking system as claimed in claim 5, wherein said piston incorporates a metered orifice which determines the rate at which pressure in said memory chamber can decay.

7. A braking system as claimed in claim 6, wherein said orifice comprises a radial port in the wall of said piston, and an annular seal disposed between said piston and said bore in which said piston works is movable between opposite sides of said port when acted upon by appropriate differing pressures in said application chamber and said memory chamber.

8. A braking system as claimed in claim 7, wherein said seal is retained in a radial groove in the wall of the piston.

9. A braking system as claimed in claim 1, wherein said supply comprises a supply of fluid under pressure in a reservoir.

10. A braking system as claimed in claim 9, including an emergency supply of fluid under pressure, wherein said reservoir is supplied through said relay valve with fluid under pressure from said emergency supply, and a safety spring assembly is incorporated in said relay valve, said spring assembly being arranged automatically to urge said relay valve into position to isolate said brake from an exhaust port and to place said reservoir in direct communication with said brake in the event of failure of said emergency supply.

* * * * *